United States Patent [19]

Anderson et al.

[11] 4,252,935

[45] Feb. 24, 1981

[54] ESTERS OF DIGLYCIDYL POLYETHERS OF HYDROGENATED PHENOLS AND COATING COMPOSITIONS CONTAINING SAME

[75] Inventors: Carl C. Anderson, Allison Park; William J. Birkmeyer, Oakmont; Roger M. Christenson; Rostyslaw Dowbenko, both of Gibsonia; Ronald J. Lewarchik, Natrona Heights, all of Pa.

[73] Assignee: PPG Industries, Inc., Pittsburgh, Pa.

[21] Appl. No.: 62,589

[22] Filed: Jul. 31, 1979

[51] Int. Cl.³ .............................................. C08G 59/16
[52] U.S. Cl. ...................................... 528/45; 525/488; 525/514; 525/533; 528/73; 528/161; 528/254; 528/261; 528/365; 560/231; 560/240
[58] Field of Search ................ 560/231, 240; 525/488, 525/514, 533; 528/45, 73, 161, 254, 365, 261; 260/18 EP

[56] References Cited

U.S. PATENT DOCUMENTS

| | | | |
|---|---|---|---|
| 3,256,226 | 6/1966 | Fekete et al. | 260/23.5 |
| 3,989,610 | 11/1976 | Tsukada et al. | 204/159.15 |
| 4,119,595 | 10/1978 | Bauer et al. | 260/21 |

OTHER PUBLICATIONS

Shell Development Company, "High Solids Esters, Developmental Resin DRM-151 Esterified 85% With Fatty Acids."

*Primary Examiner*—Earl A. Nielsen
*Attorney, Agent, or Firm*—Charles R. Wilson

[57] ABSTRACT

Esters of glycidyl polyethers of saturated phenols are especially useful in coating compositions having a low organic solvent content. The esters are the reaction products of from about 0.5 to about 1.5 equivalents of a saturated monocarboxylic acid with each epoxy group in a diglycidyl polyether of phenols where the aromatic rings of the phenols are saturated.

17 Claims, No Drawings

ESTERS OF DIGLYCIDYL POLYETHERS OF HYDROGENATED PHENOLS AND COATING COMPOSITIONS CONTAINING SAME

BACKGROUND OF THE INVENTION

The subject invention relates to novel esters and coating compositions containing them. More particularly, it relates to esters of diglycidyl polyethers of saturated phenols and their use in coating compositions.

There have been recent concerns as to the polluting effects and health concerns associated with the use of organic solvents. Many useful coating compositions contain appreciable amounts of organic solvents. Precautions in the use of the coating compositions and the installation of solvent recovery systems have alleviated some of the concerns. However, it would still be desirable to formulate coating compositions containing little or no organic solvent.

Various attempts have been made to lower the organic solvent content in coating compositions. One line of work has concentrated on using water as the liquid carrier in place of the organic solvent. However, this has necessitated changes in the resin formulations with a consequent change in performance obtained from the coating compositions.

Another line of work has attempted to formulate coating compositions containing a high solids content, and thus low organic solvent content. The problem associated with many of the high solids coating compositions has been the fact such compositions normally are highly viscous and are hard to apply using conventional coating techniques. The formulation of coating compositions having a low organic solvent content which also possess a viscosity which allows the compositions to be applied by conventional techniques would be most desirable.

There have now been found compounds which when properly formulated into coating compositions provide compositions which can be readily applied and give coatings having a desired set of properties.

As used herein, all percents and ratios are by weight unless otherwise indicated.

SUMMARY OF THE INVENTION

The esters described herein are the reaction products of from about 0.5 to about 1.5 equivalents of a saturated monocarboxylic acid with each epoxy group of a diglycidyl polyether of phenols where the aromatic rings of the phenols are saturated.

The above esters are especially useful when formulated with a crosslinking agent selected from the group consisting of aminoplasts, isocyanates, blocked isocyanates, phenoplasts, and mixtures thereof to form a coating composition. The coating compositions can have an organic solvent content of below about 40 percent.

DETAILED DESCRIPTION OF THE INVENTION

The following paragraphs describe the esters of diglycidyl polyethers of saturated phenols, their process of making and their use in coating compositions.

The esters of this invention can be made from diglycidyl polyethers of phenols having the idealized structural formula:

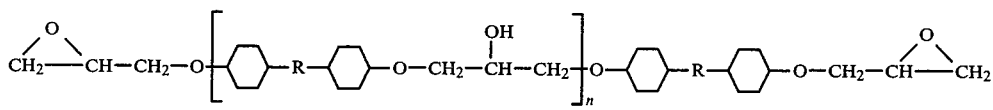

where R has from 1 to 4 carbon atoms and n has a number so that the average molecular weight of the diepoxide is from about 350 to about 3000. These compounds are available commercially or can be manufactured from the reaction product of an appropriate diphenol compound and epihalohydrin, followed by hydrogenation of the aromatic rings. Examples of diphenol compounds are bis(4-hydroxyphenyl)methane, i.e., bisphenol F; 1,1-bis(4-hydroxyphenyl)ethane; 2,2-bis(4-hydroxyphenyl)propane, i.e., bisphenol A; and 1,1-bis(4-hydroxyphenyl)butane. 2,2-Bis(4-hydroxyphenyl)propane is preferred. Suitable epihalohydrins include epichlorohydrin and epibromohydrin.

Suitable catalysts for use in the reaction of the diphenol compound with the epihalohydrin are tertiary amines such as triethylamine, tri-n-propylamine, benzyldimethylamine, N,N-dimethylaniline and triethanolamine, quaternary ammonium hydroxides, quaternary ammonium halides, alkali halides such as lithium chloride, potassium chloride and sodium chloride, and hydrazines with a tertiary nitrogen atom. As a general rule, the reaction of the diphenol compound with epihalohydrin occurs at elevated temperatures, e.g., from about 60° C. to about 200° C. Agents for splitting off hydrogen halide which are used are, as a rule, strong alkalis such as anhydrous sodium hydroxide or concentrated sodium hydroxide solution. However, other alkaline reagents such as potassium hydroxide, barium hydroxide, sodium carbonate or potassium carbonate can also be used to produce the diglycidyl compounds.

The above-described reaction products are hydrogenated in known manner as illustrated in U.S. Pat. No. 3,336,241, issued Aug. 15, 1967. The disclosure of this patent is herein incorporated by reference.

Esters of the above-described hydrogenated compounds are made by the reaction of the hydrogenated compound with a carboxylic acid. Such carboxylic acids are saturated monocarboxylic acids having from 1 to 18 carbon atoms. Examples of such acids include acetic acid, propionic acid, butyric acid, caproic acid, myristic acid, palmitic acid, stearic acid, neodecanoic acid, dodecanoic acid, and pelargonic acid. Hydroxy-substituted carboxylic acids are also useful and can be used alone or in combination with any of the aforedescribed acids. The hydroxyl groups on the carboxylic acid provide additional sites for curing with a crosslinking agent as discussed below. Examples of carboxylic acids having hydroxyl substitution include 12-hydroxystearic acid, 2,2-dimethylolpropionic acid, 4-hydroxybutyric acid, 5-hydroxycaproic acid, glycolic acid and lactic acid. The monocarboxylic acids having from 4 to 18 carbon atoms are preferred. Particularly preferred carboxylic acids are pelargonic acid, neodecanoic acid, 12-hydroxystearic acid, 2,2-dimethylolpropionic acid and mixtures thereof.

A level of the monocarboxylic acid reacted with the hydrogenated diglycidyl polyether of the phenols ranges from about 0.5 to about 1.5, preferably from about 0.8 to about 1.2 equivalents of the acid with each epoxy group in the hydrogenated diglycidyl polyether phenol. The resultant reaction products have hydroxyl groups on the molecule for use in further reaction with the below described crosslinking agents.

The formation of the ester occurs at a temperature of from about 50° C. to about 200° C. in the presence or absence of solvents. A suitable catalyst such as a tertiary amine, quaternary ammonium hydroxide, quaternary ammonium halide or lithium carbonate can be used.

The above-described esters have a relatively low molecular weight, yet are substantially non-volatile upon exposure to elevated temperatures. The esters can also be thinned with relatively little organic solvent to substantially reduce their viscosities. These properties make the esters especially useful in coating compositions where only a low level of organic solvent can be tolerated. Thus coating compositions can be formulated with the esters and suitable crosslinking agents using little or no organic solvent. The resultant compositions have a low viscosity and can be applied using conventional coating techniques. Moreover, coatings resulting from the compositions are durable, have a good appearance and can have a high gloss.

COATING COMPOSITIONS

Coating compositions of this invention consist essentially of from about 5 percent to about 90 percent of the above ester, preferably from about 10 percent to about 50 percent of the ester, and from about 5 percent to about 80 percent, preferably from about 20 percent to about 60 percent, of a suitable crosslinking agent. Examples of crosslinking agents are the aminoplasts, isocyanates, blocked isocyanates, phenoplasts and mixtures thereof. Preferred are the aminoplasts and blocked isocyanates. The aforedescribed classes of crosslinking agents are described in more detail in the following paragraphs.

Aminoplast resins are based on the addition products of formaldehyde, with an amino- or amido-group carrying substance, e.g., urea, ethylene diurea, ethylene urea, melamine and benzoguanamine. Condensation products obtained from the reaction of alcohols and formaldehyde with melamine, urea or benzoguanamine are preferred herein. Useful alcohols used to make etherified products are monohydric alcohols such as methanol, ethanol, propanol, butanol, benzyl alcohol and butoxyethanol. An etherified melamine-formaldehyde resin is the preferred aminoplast resin. U.S. Pat. No. 4,075,141, Porter et al, Feb. 21, 1978, contains a description of useful aminoplast resins and is incorporated herein by reference.

Isocyanates useful as a crosslinking agent include any of the many organic isocyanates available. Examples include p-phenylene diisocyanate, biphenyl diisocyanate, toluene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene bis(phenylisocyanate), isophorone diisocyanate, 1,2,4-benzene triisocyanate, polymethylene polyphenyl isocyanate, bis(isocyanatocyclohexyl)methane and methyl cyclohexyl diisocyanate, as well as derivatives thereof.

Blocked isocyanates containing substantially no free isocyanate groups and relatively inactive at room temperature are very useful crosslinking agents. Typical blocking agents are the phenols, thiols, oximes, caprolactams, and secondary aromatic amines. Many of these compounds are commercially available. "The Chemistry of Organic Film Formers", Robert E. Krieger Pub. Co., copyrighted 1977, by D. H. Solomon, pp. 216–217, contains a description of many blocked isocyanates that can be used here. This disclosure is herein incorporated by reference.

Phenoplast resins include the condensation product of an aldehyde with a phenol. Formaldehyde is a preferred aldehyde. Various phenols can be used, e.g., phenol per se, cresol, para-phenylphenol, para-tertiarybutyl-phenol, para-tertiaryamylphenol and cyclopentylphenol. The methylol phenol ethers described in U.S. Pat. No. 2,597,330 (herein incorporated by reference) are especially useful.

The coating compositions consist essentially of the aforedescribed esters and the crosslinking agents. Generally, however, coating composition additives are included in the compositions. A solvent such as water or an organic solvent, e.g., the ketones, ethylene glycol monoalkyl ether acetates, the mono- and dialkyl ethers of ethylene and propylene glycol, xylene, toluene and lower alcohols can be used. The level of the organic solvent in the composition, however, is preferably less than about 40 percent, more preferably less than about 30 percent, of the composition. Other coating composition additives include pigments, fillers, antioxidants, flow control agents, surfactants, catalysts and reactive diluents. Preferred flow control agents are those microgel particles which are crosslinked polymeric microparticles having sizes varying from about 0.01 to about 40 microns, more preferably from about 0.01 to about 10 microns, and most preferably from about 0.1 to about 5 microns. The microgel dispersions described in U.S. Pat. Nos. 3,652,472; 3,880,796; 3,966,667; 3,992,486; 4,025,474; and 4,147,688 and British Pat. No. 967,051 (the disclosures of which are herein incorporated by reference) are useful here. The dispersions described in U.S. Pat. No. 4,147,688 are especially preferred. Such agents are included in the coating compositions at a level ranging from about 0.1 percent to about 25 percent. Other curable resins can also be included in the compositions.

The coating compositions are applied by any convenient method, including spraying, dipping and flow coating. The compositions have been found especially useful for the coating of metal substrates where solvent, humidity and weather resistance are important, e.g. automotive parts.

The following examples are illustrative of the described invention, will Example II representing a preferred embodiment. The exemplified processes all produce the esters of glycidyl polyethers of saturated phenols of this invention.

EXAMPLE I

A five-liter reaction flask is equipped with heating means, stirring means and a nitrogen sparge. The flask is initially charged with 1728 grams of the diglycidyl ether of hydrogenated 2,2-bis(4-hydroxyphenyl)propane (available from the Shell Chemical Co. as DRH-151.1), 1272 grams of neodecanoic acid and 9 grams of dimethyl-coco-amine. The reaction mixture is heated to 120° C. and allowed to exotherm to about 140° C. The mixture is kept at 140° C. for about 3 hours until an acid number below 2 is obtained. The resultant mixture has a Gardner-Holdt viscosity of Z-6–Z-7, an acid number of 0.5 and a hydroxyl number of 148.9.

EXAMPLE II

A three-liter reaction flask is set up as in Example I. To the flask is charged 878 grams of the diepoxide of Example I, 1122 grams of 12-hydroxystearic acid and 6 grams of dimethyl-coco-amine.

The reactants are heated to 115° C. and allowed to exotherm to 120° C. while maintaining a nitrogen blanket. The reaction mixture is held at 140° C. for about 8 hours until an acid number of below 2 is obtained.

The above reaction mixture has a Gardner-Holdt viscosity of X, an acid number of 1.9 and a hydroxyl number of 197.7.

EXAMPLE III

A three-liter reaction flask set up as in Example I is charged with 1167 grams of the diepoxide used in Example I, 950 grams of neodecanoic acid, 83 grams of dimethylolpropionic acid and 6 grams of dimethyl-coco-amine. The reaction mixture is heated to 115° C. and allowed to exotherm to about 120° C. The mixture is held at this temperature for about 4 hours, until an acid number of below 1 is obtained.

The resultant reaction mixture has a Gardner-Holdt viscosity of Z-3, an acid number of 0.7, and a hydroxyl number of 178.3.

EXAMPLE IV

A coating composition is formulated as follows:

|  | Percent |
| --- | --- |
| Ester of Example II | 14.3 |
| Methylolated melamine-formaldehyde condensate[1] | 22.8 |
| Microgel dispersion[2] | 12.9 |
| Pigment paste[3] | 5.9 |
| Acrylic resin[4] | 19.1 |
| Para-toluene sulfonic acid salt of diisopropanolamine | 0.4 |
| Phenyl acid phosphate salt of diisopropanolamine | 0.2 |
| Subsituted Benzotriazole[5] | 1.1 |
| Butylacetate | 23.3 |

[1]The methylolated melamine-formaldehyde condensate is an aminoplast resin sold by American Cyanamid Co. as Cymel 303.
[2]The microgel dispersion corresponds to the dispersion described in Example II of U.S. Pat. 4,147,688.
[3]The pigment paste contains 18.3 percent aluminum paste; 13.6 percent of a pigment grind resin based on 10 percent hydroxyethyl acrylate, 4 percent methacrylic acid, 20 percent styrene, 15 percent butyl acrylate and 51 percent isobutyl methacrylate; 25.8 percent ethylene glycol monoethyl ether acetate; 1.5 percent butanol; 0.4 percent isopropanol; 20.2 percent toluene; and 20.2 percent high flash naphtha.
[4]Same resin as found in the pigment paste.
[5]Available from Ciba-Geigy Corp. as Tinuvin 328.

The above composition has a viscosity of 22 seconds when measured with a #4 Ford cup at 24° C.

The composition is readily applied by spray means to a metal panel. The coated panel, after being baked at 120° C. for 30 minutes, has an acceptable appearance and compares favorably with a commercially used enamel in terms of its sag resistance, solvent resistance, acid resistance and water soak resistance.

EXAMPLE V

The following composition is formulated:

|  | Percent |
| --- | --- |
| Ester of Example I | 17.9 |
| Aminoplast resin[1] | 17.9 |
| Pigment paste[2] | 33.1 |
| Acrylic resin[3] | 10.1 |
| 2,2-Dimethyl-3-hydroxypropyl-2',2'-dimethyl-3'-hydroxypropronate[4] | 9.0 |
| Microgel dispersion[3] | 8.0 |
| Benzotriazole[3] | 1.3 |
| p-Toluene sulfonic acid salt of diisopropanolamine | 1.1 |
| Phenyl acid phosphate salt of diisopropanolamine | 0.4 |
| Ethanol | 0.4 |
| Methyl amyl ketone | 0.8 |

[1]A melamine resin available from Monsanto Co. as Resimene 755.
[2]The pigment paste contains 67 percent titanium dioxide; 12 percent of a grind resin made from 10 percent hydroxyethyl acrylate, 2.5 percent methacrylic acid (with 25 percent of the methacrylic acid reacted with hydroxyethylethyleneimine), 30 percent styrene, 20 percent 2-ethylhexyl acrylate, 19.5 percent butyl methacrylate and 18 percent methyl methacrylate; and 21 percent solvent.
[3]As used in Example IV.
[4]Available from Union Carbide Corp. as Ester Diol 204.

The above composition has a viscosity of 23 seconds with a No. 4 Food cup.

The composition provides a durable coating to metal panels when applied as a spray and tested as in Example IV.

What is claimed is:

1. A reaction product of from about 0.5 to about 1.5 equivalents of a saturated monocarboxylic acid with each epoxy group in a diglycidyl polyether of hydrogenated dihydric phenols.

2. The reaction product of claim 1 wherein the diglycidyl polyether of the phenols is selected from the group consisting of hydrogenated diglycidyl polyethers of bis(4-hydroxyphenyl) methane, 1,1-bis(4-hydroxyphenyl) ethane, 2,2-bis(4-hydroxyphenyl) propane, 2,2-bis(4-hydroxyphenyl) butane and mixtures thereof.

3. The reaction product of claim 2 wherein the diglycidyl polyether of the phenols is a hydrogenated diglycidyl polyether of 2,2-bis-(4-hydroxyphenyl) propane.

4. The reaction product of claims 1, 2 or 3 wherein the mono-carboxylic acid has from 1 to 18 carbon atoms.

5. The reaction product of claim 4 wherein the monocarboxylic acid has from 4 to 18 carbon atoms.

6. The reaction product of claim 5 wherein from about 0.8 to about 1.2 equivalents of the monocarboxylic acid are reacted with each epoxy group in the diglycidyl ether of the phenols.

7. The reaction product of claim 6 wherein the monocarboxylic acid is selected from the group consisting of pelargonic acid, neodecanoic acid, 12-hydroxystearic acid, dimethylolpropionic acid and mixtures thereof.

8. A coating composition consisting essentially of:
   (a) from about 5 percent to about 90 percent of the reaction product of from about 0.5 to about 1.5 equivalents of a saturated monocarboxylic acid with each epoxy group in a diglycidyl polyether of hydrogenated dihydric phenols; and
   (b) from about 5 percent to about 80 percent of a crosslinking agent selected from the group consisting of aminoplasts, isocyanates, blocked isocyanates, phenoplasts and mixtures thereof.

9. The composition of claim 8 wherein the composition contains less than about 40 percent organic solvent.

10. The composition of claim 8 wherein the diglycidyl polyether of the phenols is selected from the group consisting of hydrogenated diglycidyl polyethers of bis(4-hydroxyphenyl) methane, 1,1-bis(4-hydroxyphenyl) ethane, 2,2-bis(4-hydroxyphenyl) propane and 2,2-bis(4-hydroxyphenyl) butane and mixture thereof.

11. The composition of claim 10 wherein the diglycidyl polyether of the phenols is a hydrogenated diglycidyl polyether of 2,2-bis(4-hydroxyphenyl) propane.

12. The composition of claims 8, 10 or 11 wherein the mono-carboxylic acid has from 1 to 18 carbon atoms.

13. The composition of claim 12 wherein from about 0.8 to about 1.2 equivalents of a monocarboxylic acid having from 4 to 18 carbon atoms are reacted with each epoxy group in the diglycidyl ether of the phenols.

14. The composition of claim 8 wherein the crosslinking agent is an aminoplast.

15. The composition of claim 8 wherein the crosslinking agent is a blocked isocyanate.

16. The composition of claims 8 or 10 wherein the ester represents from about 10 percent to 50 percent of the composition and the crosslinking agent from about 20 percent to about 60 percent of the composition.

17. The composition of claim 16 additionally consisting essentially of from about 0.1 percent to about 25 percent of a microgel dispersion flow control agent.

* * * * *